Aug. 30, 1966     R. W. NORTON     3,269,696
STOPCOCK AND PLUG RETAINER THEREFOR
Filed May 8, 1964
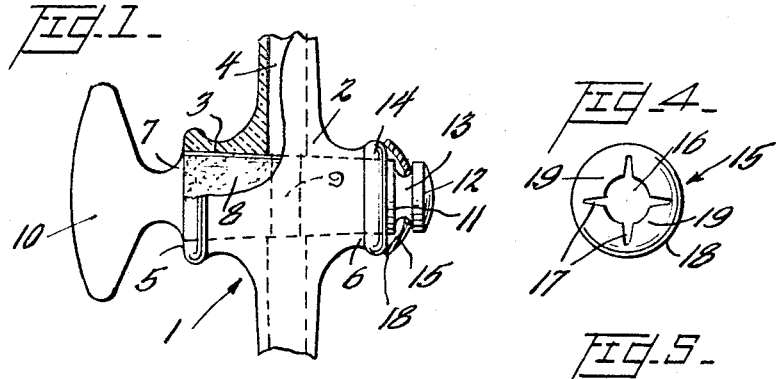
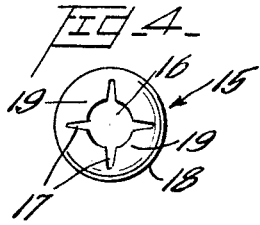
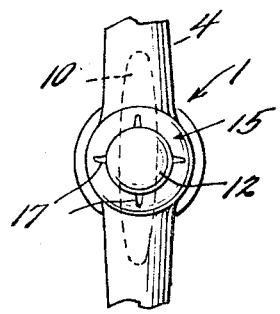
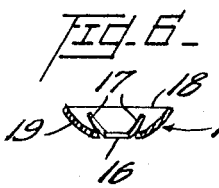
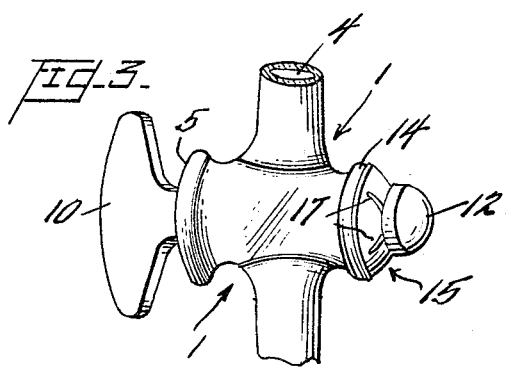
Inventor
Robert W. Norton,
By Smith, Michael and Gardina
Attorneys United States Patent Office 3,269,696
Patented August 30, 1966

3,269,696
STOPCOCK AND PLUG RETAINER THEREFOR
Robert W. Norton, Landisville, N.J., assignor to Kontes Glass Company, Vineland, N.J., a corporation of New Jersey
Filed May 8, 1964, Ser. No. 365,929
5 Claims. (Cl. 251—181)

This invention relates to stopcocks made of glass or plastic such as used extensively in technical and scientific laboratories.

These stopcocks are usually characterized by a valve body or barrel having a conical or tapered bore therethrough in which a generally conical or tapered plug or valve member is received for rotation about an axis extending longitudinally of the valve. Usually the mating surface of the valve member and valve body have a "ground" surface or finish to insure a fluid-tight joint but due to the tapered or conical shape of the valve and the valve body there is an inherent tendency for the valve to move axially away from the mating surface of the valve body and this often results in leakage of fluid through the stopcock.

With these facts in mind, the present invention has for an object the provision of means by which the valve member is resiliently biased axially toward that portion of the valve body which is of smaller internal diameter and thus tends to maintain the valve parts in close fluid-tight relation.

Another object of the invention is to provide a biasing member for a stopcock of the character described which substantially encloses one end of the stopcock and bears against the valve body and is provided with a plurality of resilient arms disposed to be engaged under tension with the valve member in a manner to exert a yielding "pull" thereon tending to urge the valve member into the small end of the tapered bore in the valve body.

Another object of the invention is to provide biasing means for the plug of a stopcock which is made of plastic material such as Teflon or polyethylene so as to preclude marring of parts of the stopcock when the latter is made of glass or other nonmetallic material.

Another object of the invention is to provide a plastic biasing retainer member for stopcock plugs as described which is substantially dome-shaped or hemispherical in form and which has plural tapered sector-shaped arms, the free ends of which converge towards a centrally disposed opening adapted to receive a shouldered portion of the plug or valve member when said arms are forced under said shoulder and flexed to develop tension therein.

These and other objects of the invention will become apparent from the following specification when read in the light of the accompanying drawings wherein:

FIGURE 1 is a side elevation of a stopcock with the invention applied thereto, with parts shown in section;

FIGURE 2 is a bottom view of a stopcock showing the invention in place thereon;

FIGURE 3 is a perspective view of a stopcock with the invention applied thereto;

FIGURE 4 is a top plan view of the retainer of the present invention;

FIGURE 5 is a side elevation of the retainer of the present invention, and

FIGURE 6 is a transverse sectional view of the retainer.

Referring more particularly to the accompanying drawings wherein I have shown a preferred form of my invention, FIGURE 1 shows my retainer applied to a stopcock 1 of more or less conventional design. The stopcock may be made of glass or similar noncorrosive material and comprises a body portion or barrel 2 having a tapered bore 3 extending therethrough transversely of the fluid duct 4 therein. The bore 3 tapers from a large diameter at 5 to a smaller diameter at 6 and seated within said bore is a valve member or plug 7 having a ground surface 8 mating with the surface of the bore 3 and adapted to form therewith a fluid-tight joint. The valve member is provided with a through duct 9 shown in FIGURE 1 in position to provide continuity for the duct 4 through the stopcock when the parts are positioned as shown. The valve member 7 is adapted to be rotated within the valve body 2 in order to position the duct 9 thereof into or out of register with the duct 4 of the valve body 2. For this purpose the valve member is provided with a thumb piece 10.

The valve member 7 extends completely through the valve body 2 and protrudes therefrom as at 11. The protruding end 11 of the valve member is formed with a snelling or knob-like member 12 and between the snelling 12 and the adjacent end 11 of the valve member there is provided a necked down portion 13 forming with the snelling 12 an annular shoulder. The small end of the barrel or valve body is provided with an annular bead or shoulder 14. The retainer of the present invention is adapted to seat on the shoulder 14 and exert tension on the protruding end of the valve member to urge the valve member into fluid-tight engagement with the tapered wall of the bore 3.

I have shown in FIGURES 4, 5 and 6 a preferred form of my retainer member and as here shown it comprises a hemispherical or dome-shaped member 15 provided with an aperture 16 at the top of the dome and generally centrally disposed therein. Radiating from the aperture 16 are a plurality of slits 17 which extend downwardly into the body of the dome to a point near to but spaced from the bottom edge 18 of said retainer 15. This construction provides a plurality of arms 19 which are integral with the body of the retainer and converge upwardly from the bottom edge thereof toward the aperture 16 at the top thereof. The radial slits 17 and the dome shape of the retainer 15 combine to provide the arms 19 with tapered sector-like shape.

As previously suggested, the retainer 15 is preferably made of some nonmarring plastic material such as Teflon or polyethylene which has sufficient inherent resiliency to provide the desired "pull" on the valve member when associated with a stopcock as shown. In use the retainer is mounted on the stopcock by placing the lower end 18 thereof on the enlarged annular bead or shoulder 14 as shown in FIGURE 1 and then snapping the fingers forcibly downward over the snelling 12 until they fall within the necked down portion 13 and beneath the snelling 12. The retainer is dimensioned so that in doing this the dome shape of the retainer is slightly flattened (compare FIGURES 5 and 6 with FIGURE 1) and thus the arms 19 are placed under appreciable compression. Due to the inherent resiliency of the plastic material of the retainer the arms tend to assume the original or dome-shaped form and thus tend to "pull" the valve member 7 into fluid-tight sealing engagement with the tapered wall of the bore 3.

It will be understood of course that while I have mentioned Teflon and polyethylene as suitable plastic material from which the retainer may be made, other plastics or polymers having the desirable properties of inherent resiliency and "soft" texture may be used if desired. The "soft" texture of the plastic is important having in mind the glass body of the stopcock and the need to avoid scraping, chipping or marring the surface of the stopcock particularly when turning the valve off and on and in applying and removing the retainer with respect to the snelling. Furthermore, Teflon and polyethylene have a high degree of chemical inertness and therefore lend themselves quite readily for use in chemical and technical laboratories where corrosive fluids are often employed.

It should further be noted that the general hemispherical or dome shape of the retainer provides an enclosure for substantially the entire protruding end of the valve member and the lower end of the retainer is seated on the bead 14 of the stopcock body under pressure effects a sealed and shielded casing which prevents foreign material from reaching and adhering to lubricants normally used in stopcock between the plug and the barrels thereof. Furthermore, the long flexible arms 19 accommodate themselves to the wide tolerances found in stopcock plugs or valve members and are thus able to maintain the desired degree of tension on the valve member in spite of these variations in length.

Having thus described my invention it will be apparent to those skilled in the art, that various changes may be made in size and proportion of parts as described without departing from the spirit of the invention which is more clearly defined in the following claims.

What I claim is:

1. In combination, a stopcock comprising a valve body of glass having a tapered bore extending therethrough, a tapered valve member of glass having a correspondingly formed mating surface seated in said bore for rotation and in surface contact with the walls of said bore, said valve body and said valve member being provided with complemental duct means which provide flow through the valve when the parts are in one position and the continuity of which duct means is broken when the parts are in a second position, the small end of the valve member projecting from the valve body and being provided with an annular shoulder disposed thereon in spaced relation to the valve body, and a generally dome shaped resilient retainer washer having an axially disposed aperture dimensioned to snap over said annular shoulder engaged under compression between said annular shoulder and the body member and tending to draw the valve member into said tapered bore to maintain the mating surfaces of the valve member and said valve body in sealing engagement, said resilient retainer being made of non-marring plastic and constituting the sole means for retaining the valve member in operative relation within said tapered bore.

2. The combination described in claim 1 wherein said plastic material is chosen from the group consisting of Teflon and polyethylene.

3. In combination, a stopcock comprising a valve body having a tapered bore extending therethrough, a correspondingly tapered valve member fitted within said bore with the external surface of the valve member in mating contact and sealing engagement with the internal surface of said tapered bore, both the valve member and valve body being made of glass, said valve member having at its small end an integral shouldered extension extending beyond the end of said valve body and a biasing retainer member engaged under compression between said end of said valve body and the shouldered extension of said valve member, said retainer member being made of plastic material having inherent resiliency and having a hollow generally dome-shaped body portion open at one end, said open end being dimensioned to seat in circumscribing relation upon the valve body adjacent to the shouldered extension of the valve member, the dome-shaped body of said retaining member being provided with plural longitudinally-extending slits defining resilient arms having inwardly directed free end portions disposed in circumferentially spaced relation about the axis of the dome, and dimensioned to engage beneath said shouldered extension whereby to draw the valve member into said tapered bore.

4. The stopcock combination recited in claim 3 wherein the plastic retainer member is the sole means for maintaining the valve member within the tapered bore of the valve body.

5. The combination described in claim 3 wherein said valve body is provided at the small end thereof with an annular bead formation and said bias retainer member is dimensioned to seat on said bead formation and form a tight seal therewith under the compression developed in said retainer when disposed between the valve body and said shoulder.

References Cited by the Examiner

UNITED STATES PATENTS

| | | | |
|---|---|---|---|
| 454,234 | 6/1891 | Stafford | 251—181 |
| 2,325,193 | 7/1943 | Nutt | 267—1 |
| 2,615,672 | 10/1952 | Hinrichs | 251—309 |
| 2,708,562 | 5/1955 | Schmid | 251—181 |
| 2,876,985 | 3/1959 | Birchall | 251—181 X |
| 3,013,792 | 12/1961 | Steinlein | 267—1 |
| 3,093,358 | 6/1963 | Wakeman | 251—181 X |
| 3,179,087 | 4/1965 | Kahn | 267—1 |

WILLIAM F. O'DEA, *Primary Examiner.*

HAROLD WEAKLEY, *Examiner.*